United States Patent
Matsushita

(10) Patent No.: US 9,317,178 B2
(45) Date of Patent: Apr. 19, 2016

(54) INFORMATION PROCESSING APPARATUS WITH REDUCED REPETITION OF AUDIO GUIDANCE

(75) Inventor: Takahiro Matsushita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 881 days.

(21) Appl. No.: 12/703,117

(22) Filed: Feb. 9, 2010

(65) Prior Publication Data

US 2010/0211875 A1   Aug. 19, 2010

(30) Foreign Application Priority Data

Feb. 17, 2009  (JP) ................. 2009-034034

(51) Int. Cl.
G06F 3/0482 (2013.01)
G06F 3/16 (2006.01)
G06F 9/44 (2006.01)

(52) U.S. Cl.
CPC .............. *G06F 3/0482* (2013.01); *G06F 3/167* (2013.01); *G06F 3/16* (2013.01); *G06F 9/4446* (2013.01)

(58) Field of Classification Search
CPC ......... G06F 9/4446; G06F 3/16; G06F 3/167; G06F 3/0482
USPC ....................................... 715/727
See application file for complete search history.

(56) References Cited

U.S. PATENT DOCUMENTS

| 5,806,077 | A  | * | 9/1998  | Wecker ........................ 715/236 |
| 6,392,670 | B1 | * | 5/2002  | Takeuchi et al. ............. 715/760 |
| 7,379,876 | B2 |   | 5/2008  | Nakata |
| 7,467,192 | B1 | * | 12/2008 | Lemler et al. ................. 709/223 |
| 7,637,421 | B1 | * | 12/2009 | Trocme ......................... 235/379 |
| 7,904,079 | B1 | * | 3/2011  | Lundy et al. .................. 455/423 |
| 2001/0038461 | A1 | * | 11/2001 | Murakami et al. ........... 358/1.13 |
| 2002/0130836 | A1 | * | 9/2002  | Ohmori et al. ................ 345/156 |
| 2003/0223411 | A1 | * | 12/2003 | de la Fuente ................. 370/359 |
| 2005/0031392 | A1 | * | 2/2005  | Yamamoto et al. ............ 400/62 |
| 2005/0076302 | A1 | * | 4/2005  | Okamoto ...................... 715/709 |
| 2005/0081152 | A1 | * | 4/2005  | Commarford et al. ........ 715/705 |
| 2006/0087938 | A1 | * | 4/2006  | Lin .............................. 369/47.1 |
| 2007/0097453 | A1 | * | 5/2007  | Kimura .................... G06F 3/16 358/474 |
| 2010/0184005 | A1 | * | 7/2010  | Eklund et al. .................. 434/29 |

FOREIGN PATENT DOCUMENTS

| CN | 1283341 A   | 2/2001  |
| CN | 1779847 A   | 5/2006  |
| JP | 10-307512 A | 11/1998 |

* cited by examiner

*Primary Examiner* — Aaron Lowenberger

(74) *Attorney, Agent, or Firm* — Canon USA, Inc. IP Division

(57) ABSTRACT

In an apparatus configured to reproduce audio guidance corresponding to a screen, when there is an instruction to switch to a screen in a backward direction, since audio guidance has already been reproduced once during a screen transition in a forward direction, the same audio guidance is not reproduced again.

6 Claims, 15 Drawing Sheets

FIG.5

| SCREEN (501) | TIME OF PREVIOUS SWITCHING TO THE SCREEN (502) | TIME FOR DETERMINING WHETHER TO REPRODUCE AUDIO (503) |
|---|---|---|
| A | 2008/10/30 20:50:01 | 30 [m] |
| B | 2008/10/30 20:55:34 | 20 [m] |
| C | 2008/10/30 20:30:12 | 20 [m] |
| ⋮ | ⋮ | ⋮ |
| Z | 2008/10/30 20:40:12 | 20 [m] |

FIG.6
SCREEN A
601
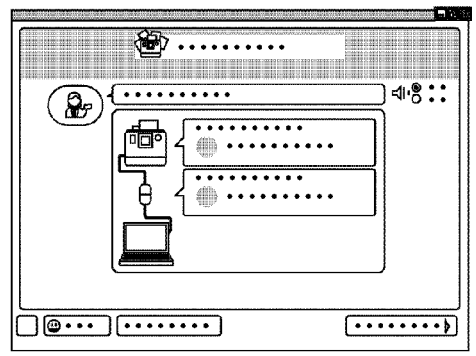
♪ READY TO PRINT ♪
SCREEN B
602
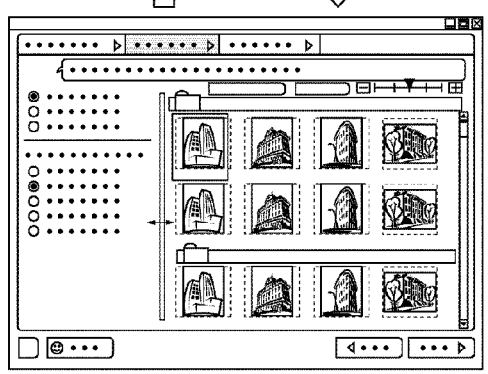
♪ CHOOSE AN IMAGE ♪
SCREEN C
603
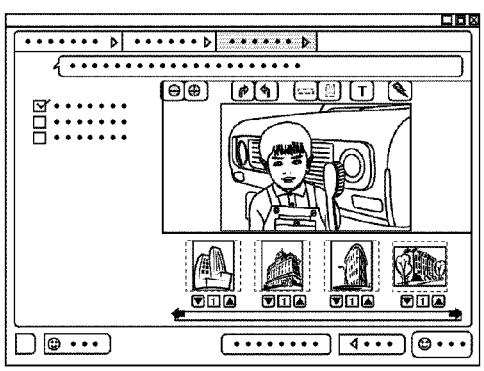
♪ PRINT OUT ♪
SCREEN
DURING
PRINTING
604
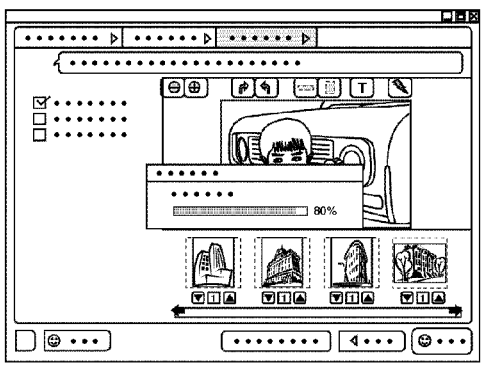

FIG.15

| SCREEN | TIME OF SWITCHING TO THE SCREEN |
|---|---|
| A | 2008/10/30 20:50:01 |
| B | 2008/10/30 20:55:34 |
| C | 2008/10/30 20:30:12 |
| ⋮ | ⋮ |
| Z | 2008/10/30 20:40:12 |

INFORMATION PROCESSING APPARATUS WITH REDUCED REPETITION OF AUDIO GUIDANCE

BACKGROUND OF THE INVENTION

1. Field of the Invention

The present invention relates to an information processing apparatus configured to reproduce audio corresponding to a display screen.

2. Description of the Related Art

In recent years, printing apparatuses have been configured with an increased number of functions and such functions are increasingly complicated. Consequently guidance for explaining functions of print settings is provided not only by display on the user interface (UI) but also by audio guidance. Inputting settings in accordance with audio guidance enables even users who are inexperienced in such operations to input print settings without issues. When implementing audio guidance, an image forming apparatus has been proposed which is configured to reduce the troublesome aspects of audio guidance by controlling the time or frequency until audio guidance is output. (U.S. Pat. No. 7,379,876).

A user is given a sense of security by providing audio guidance through the entire sequence of operations. However situations associated with low effectiveness arise due to the fact that the same audio guidance is repeated a number of times as a result of reproducing the same audio guidance a number of times during a single cycle of print settings or when executing a plurality of print settings in sequence.

SUMMARY OF THE INVENTION

The present invention is directed to an apparatus that includes a display control unit configured to switch a screen to be displayed according to an instruction, a reproduction unit configured to reproduce audio guidance corresponding to the switched screen in response to switching of the screen according to the instruction, and a control unit configured, when a predetermined condition is satisfied, to control the reproduction unit not to reproduce audio guidance. In the apparatus, the screen has a predetermined sequence, and when switching to a next screen is executed, the control unit controls the reproduction unit to reproduce audio guidance corresponding to the switched screen, and when switching to a previous screen is executed, the control unit controls the reproduction unit not to reproduce audio guidance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a screen switching time list according to a fifth exemplary embodiment of the present invention.

FIG. 6 illustrates audio guidance and a UI screen for a printing application according to the present exemplary embodiment.

FIG. 15 illustrates an example of a screen switching time list.

DESCRIPTION OF THE EMBODIMENTS

Various exemplary embodiments, features, and aspects of the invention will be described in detail below with reference to the drawings.

Figure 8:
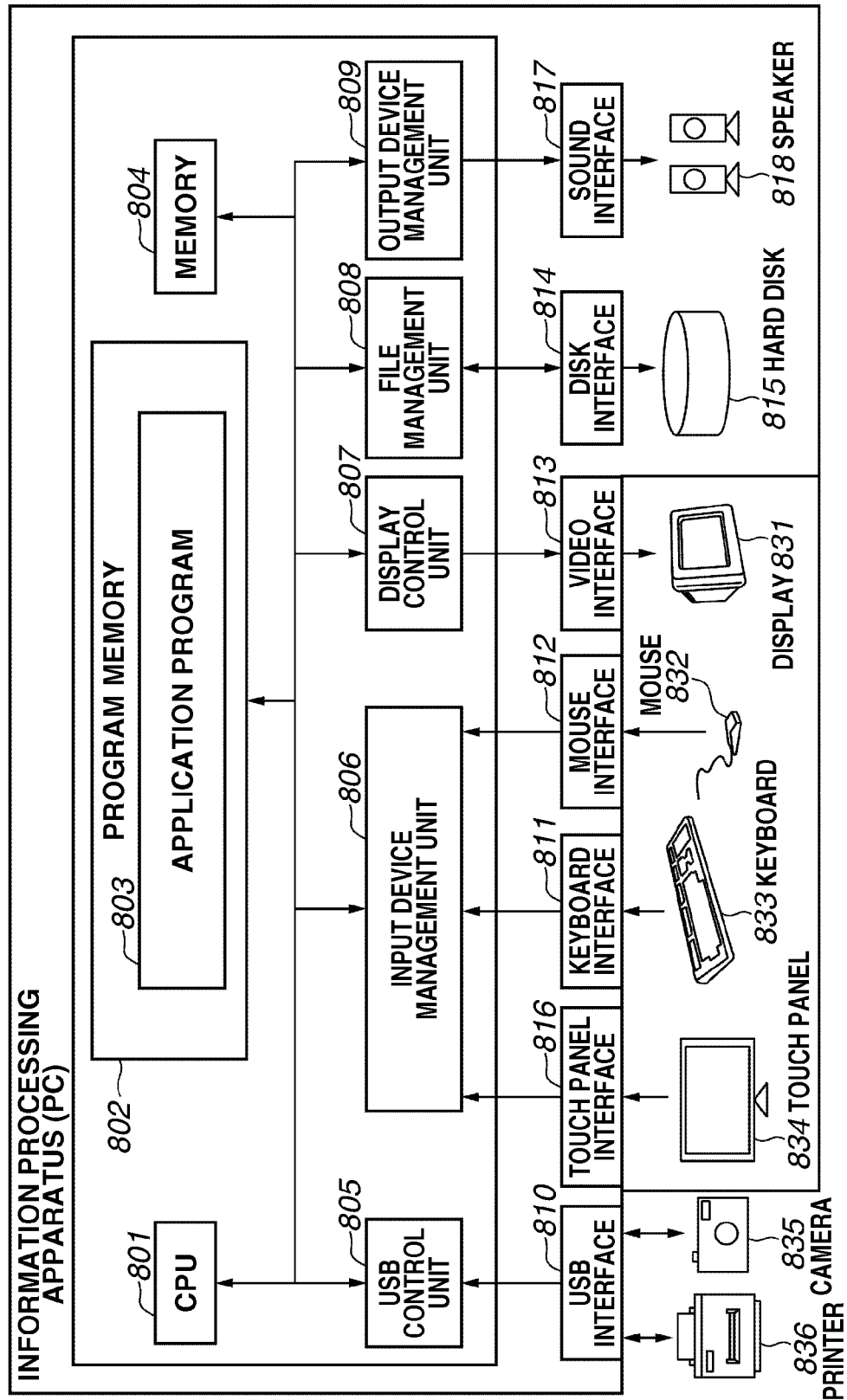
FIG. 8 is a block diagram illustrating an arrangement of an information processing apparatus according to the fourth exemplary embodiment of the present invention.

In FIG. 8, a central processing unit (CPU) 801 controls an information processing apparatus. A program memory 802 is configured to store various types of data or programs. A memory 804 is used for temporary storage of data or as a work place. The CPU 801 uses programs read from the program memory 802 to execute various processes by controlling each unit of the information processing apparatus. The processes in FIG. 1 to FIG. 4 described hereafter are executed by controlling each unit based on programs read from the program memory 802 by the CPU 801.

An application program 803 is stored in the program memory. The application program 803 includes display data for the UI display or audio data used in the application and is used by reading out from the program memory 802.

In FIG. 8, a hard disk 815 is configured to physically store files or data, a disk input/output (I/O) interface 814 enables the file management unit 808 to read and write the hard disk 815. The file management unit 808 is configured to control writing, reading, and management of data stored in the hard disk 815. The application program 803 may be stored in the hard disk 815 and the hard disk 815 may be used as a program memory.

A video interface 813 is configured to display an image, UI screen or the like. A display control unit 807 is configured to reproduce display data for displaying a display screen or image on a display 831 connected via the video interface 813 or control display operations on the display 831.

A keyboard interface 811 is configured so that the input device management unit 806 can receive input from the keyboard 833. A mouse interface 812 enables the input device management unit 806 to receive input from the mouse 832. A touch panel interface 816 is configured so that the input device management unit 806 can receive input from the touch panel 834. The input device management 806 is configured to receive input from the mouse 832, keyboard 833, and touch panel 834 and manages reception of input from a user.

Although the display 831, the mouse 832, the keyboard 833, and the touch panel 834 are devices which are connected to the information processing apparatus, they may be arranged as units of the information processing apparatus.

A sound interface 817 is configured to output audio from a speaker 818 and outputs audio or music from the speaker 818 based on management executed by the output device management unit 809. The output device management unit 809 controls the output of audio from a speaker 818 and controls the volume and the like.

A USB interface 810 enables connection of a digital camera 835 or a printer 836. A USB control unit 805 controls communication with external devices connected by the USB interface 810 or controls data transmission and reception. The information processing apparatus enables acquisition of image files stored in the digital camera 835 via the USB interface 810 or transmission of image data to the printer 836 for printing of images by the printer 836.

In the information processing apparatus, printing control is executed for printing of image files stored in the hard disk or image files acquired from the digital camera 835 for printing by the printer 836. Print settings or image selection for printing of images is also enabled.

The selection of images and control of print settings and printing can be executed by the printing application.

The printing application will be described with reference to FIG. 6. FIG. 6 illustrates audio guidance and a UI screen for a printing application according to the present exemplary embodiment.

The UI screen in the printing application is formed from three screens being the screen A 601, screen B 602 and screen C 603. The present invention can be applied to any configuration of a plurality of screens in addition to the three screens above. The present exemplary embodiment relates to a configuration of a plurality of print setting screens constituting the printing application for executing print settings. However, the present invention is not limited to print settings and may be applied any process requiring a plurality of operation steps requiring a screen corresponding to the respective operation steps.

Screen A is a screen configured to confirm that the printer 836 is connected and for notifying a user whether the printer 836 is connected and ready to print. Furthermore the paper type loaded in the printer 836 or the type of ink may be displayed.

Screen B is a screen configured to enable image selection for the object to be printed. The image files stored in the hard disk 815 are acquired by the file management unit 806 and displayed on the screen B for selection by a user of the image to be printed.

Screen C is configured to enable confirmation of the image to be printed. Furthermore, printing conditions (bordered print setting, borderless print setting, print settings for shooting date and shooting time) may also be set to thereby display the image in accordance with the set printing conditions. Image trimming may also be set.

Screen C includes a print button which is pressed to initiate printing process operations by sending print data for the image to be printed to the printer 836 via the USB interface 810 to thereby print the image on the printer 836. During printing processing, a message is displayed indicating printing in the same manner as the printing screen 604 together with a progress bar indicating the progress of the printing process. When printing process operations are completed, the display is extinguished.

When switching between screens A, B, and C, audio data for audio guidance corresponding to respective screens is read from the program memory 802 and audio is reproduced for output from the speaker 818 based on the audio data. In the printing application according to the present exemplary embodiment, the screens A, B, and C are prepared for each operation for execution by a user. The following audio guidance is reproduced and output from the speaker when switching to screen A: "♪ ready to print ♪ ♪", when switching to screen B: "♪ choose an image ♪ ♪", and when switching to screen C: "♪ print out ♪ ♪". Since the operations for execution by a user on the displayed screen are notified to the user using audio guidance, even an inexperienced user can execute printing in a simple manner using this printing application.

The operation sequence in this printing application is set as confirmation of connection of printer→image selection→print settings and image confirmation→printing command. Thus when the "next" button is pressed on screen A to confirm the printer connection, the screen is switched to screen B for image selection and when the "next" button is pressed on screen B, the screen is switched to screen C configured to enable confirmation and print settings. Pressing the "back" button will return the process to the previous screen. In the present exemplary embodiment, the direction of screen A (connection confirmation)→screen B (image selection)→screen C (confirmation, print settings) is referred to as the forward direction, and the direction of screen C→screen B→screen A is referred to as the backward direction. Although the present exemplary embodiment describes an example in which an apparatus with audio guidance is provided with three screens, the present invention may be applied to an application configured to discriminate between print setting screens and confirmation screens and to execute print settings using four screens. In other words, the number of screens may be varied. A configuration of a screen transition may for example move from screen A to screen C by skipping screen B. In this case, a "back" or "next" button is not provided, but rather a button configured to enable transition to respective screens is prepared and screen transition is executed by pressing that button.

In this manner, the printing application of the present exemplary embodiment outputs audio guidance for a switched screen in accordance with screen switching operations. Since the audio guidance immediately informs a user of the operations on a screen, even an inexperienced user can execute print settings in a simple manner.

In the printing application according to the first exemplary embodiment of the present invention, when an instruction for screen switching is executed in the forward direction, audio guidance is reproduced corresponding to the switched screen. However when an instruction for screen switching is executed in the backward direction, audio guidance is not reproduced. When operating in the backward direction, the screens have already been displayed once and audio guidance reproduced. Since it is troublesome to reproduce the same audio guidance a number of times, audio guidance is not reproduced. The processing at this time will be described with reference to the flowchart in FIG. 1.

Figure 1:
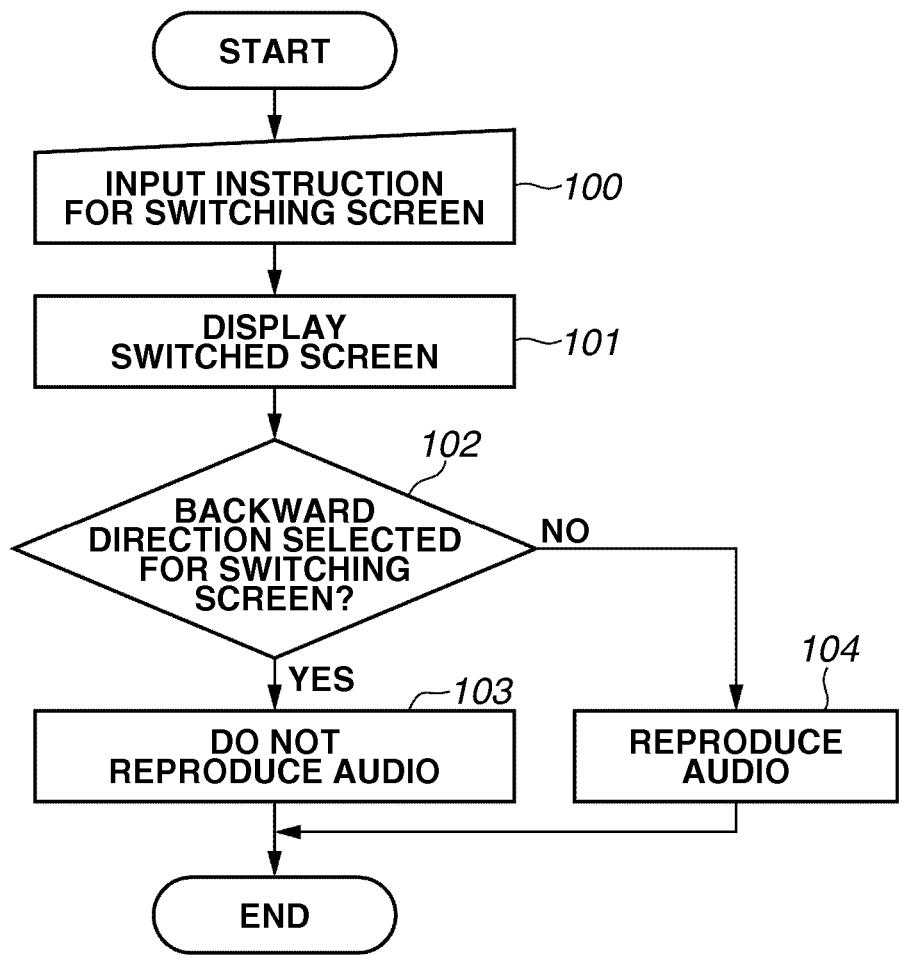
FIG. 1 illustrates a flowchart when switching a screen according to a first exemplary embodiment of the present invention.

FIG. 1 illustrates the control sequence when instructing screen transition in the backward direction.

Firstly when an instruction is input for switching the screen in step 100, in step 101, the screen is switched from the current screen and displayed according to the switching instruction. When executed in the forward direction, the screen is switched to the next screen, and when executed in the backward direction, the screen is switched to the previous screen. In step 102, it is determined whether the switching instruction in step 100 has been a switching direction in the forward direction or in the backward direction. When an instruction in the backward direction is executed (YES in step 102), then in step 103, audio corresponding to the screen displayed in step 101 is not reproduced. When an instruction in the forward direction is executed (NO in step 102), then in step 104, audio corresponding to the screen displayed in step 101 is reproduced from the speakers 818. Thus, when the backward direction is selected, since audio has already been reproduced when the screen was switched in the forward direction, there is no need to reproduce the same audio on a subsequent occasion. When an instruction in the forward direction is executed, then in step 104, data for the audio guidance corresponding to the switched screen is read out and reproduced from the speaker 818.

A second exemplary embodiment of the present invention has almost the same constitution as the first exemplary embodiment and only the points of difference will be described. In the second exemplary embodiment, when an instruction is given for screen transition in the forward direction, elapsed time is determined from display of the screen displayed according to the switching instruction on a previous occasion and reproduction of the audio guidance corresponding to that screen. Although audio is reproduced when at least a predetermined time has elapsed, when the predetermined time has not elapsed, since the same audio guidance has just been previously reproduced, audio is not reproduced. The process operation in this exemplary embodiment will be described with reference to the flowchart in FIG. 2.

Figure 2:
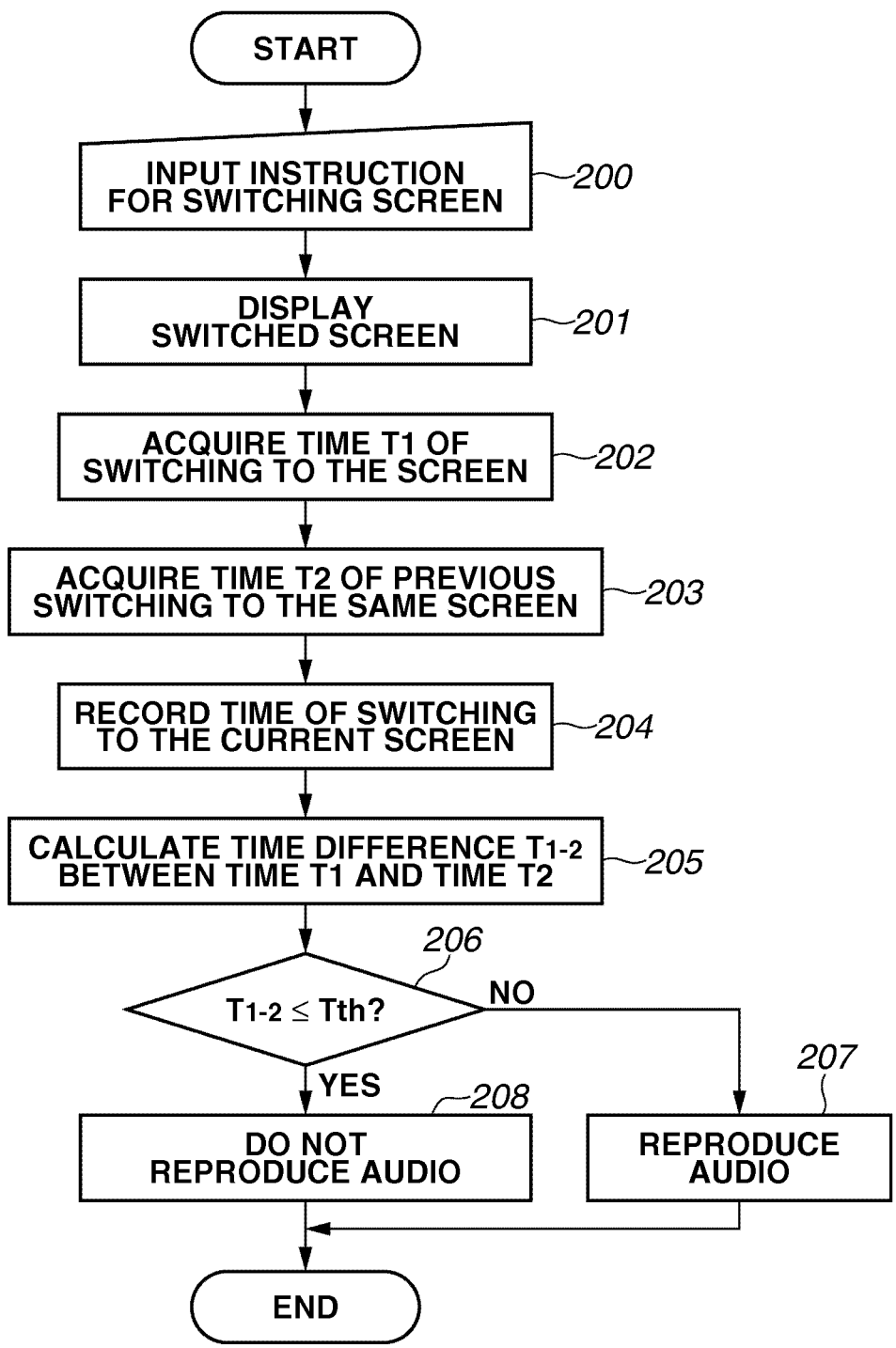
FIG. 2 illustrates a flowchart when switching a screen according to a second exemplary embodiment of the present invention.

FIG. 2 is a control sequence configured to reproduce audio guidance by instructing screen transition according to the present exemplary embodiment.

Firstly when an instruction is input for switching the screen in step 200, then in step 201, the screen is displayed according to the switching instruction and, then in step 202, the time T1 of switching to that screen is acquired. Next, in step 203, a time T2 of the previous switching to the screen switched to in step 202 is acquired. As illustrated in FIG. 15, since the switching time list of switching times for each screen is recorded in the program memory 802, the time T2 is acquired by reading the time data for the corresponding screen from the list. After acquiring the time T2, in step 204, the time T1 acquired in step 202 is taken to be the time of screen switching on this occasion and is recorded in the switching time list.

In step 205, the time difference $T_{1-2}$ between the time T1 and time T2 acquired in step 202 and step 203 is calculated. The time difference $T_{1-2}$ is the time elapsing from the switching to the screen on the previous occasion to the switching of the same screen. In step 206, it is determined whether the time difference $T1_{1-2}$ in step 206 is smaller than or equal to a predetermined time Tth. When the time difference $T_{1-2}$ is greater than the predetermined time Tth (NO in step 206), then in step 207, audio guidance corresponding to the screen switched in step 201 is reproduced. When the time difference $T_{1-2}$ is less than or equal to the predetermined time Tth (YES in step 206), then in step 208, audio guidance is not reproduced.

In the present exemplary embodiment, when switching is executed to the same screen before the predetermined time has elapsed, audio guidance is not reproduced since the same audio guidance has been reproduced before. When a certain amount of time has elapsed from switching to the screen on the previous occasion, since there is a high possibility that a user would have forgotten the details of the audio guidance, audio guidance is reproduced.

Since the operational state of a user is used to determine whether to reproduce audio guidance, it is possible to prevent reproduction of the same audio guidance a number of times during a short period.

In the present exemplary embodiment, although the elapsed time $T_{1-2}$ is calculated using the times T1 and T2 of switching to the screen on the previous and current occasions, in addition to the time of screen switching, the elapsed time $T_{1-2}$ may be calculated from the time of audio guidance reproduction or the time of input of the screen switching instruction. In this case, the time recorded in the switching time list of the program memory, the time of reproduction of audio guidance or the time of the screen switching instruction may be used. When recording the time of reproduction of audio guidance, if audio guidance is not reproduced even when the screen is switched, the time in the switching list is not updated.

In the present exemplary embodiment, although the calculation of the elapsed time $T_{1-2}$ or recording or acquiring the screen switching time is executed after switching the screen display, the determination of whether to reproduce audio may be executed prior to screen switching display in order to enable reproduction of audio guidance immediately after screen switching display.

FIG. 15 illustrates an example of a screen switching time list recorded in the program memory 802.

The time of screen switching to each respective screen is recorded and it is determined whether to reproduce the current audio guidance according to the screen switching time recorded in the screen switching time list. After the printing application is ended, when operating the printing application on the subsequent occasion, reproduction of audio guidance may be reproduced taking account of the screen switching time during the previous operation by retaining the list.

Figure 13:
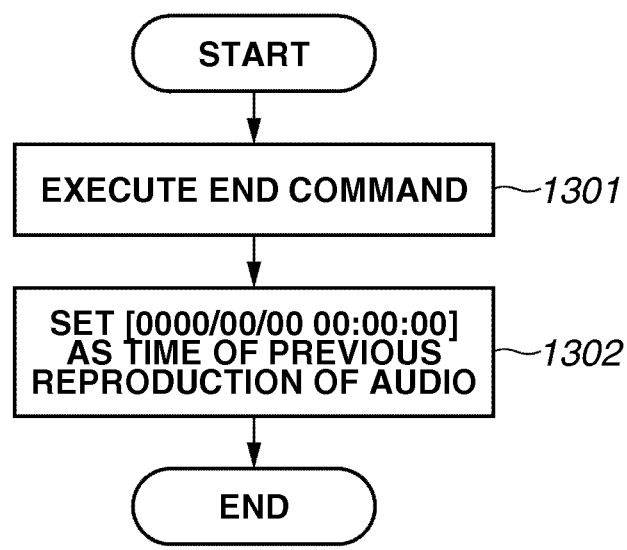
FIG. 13 illustrates a flowchart for a resetting operation for the screen switching time after completion of the printing application.

As illustrated in FIG. 13, a screen switching time reset may be executed after completion of the printing application and that process will now be described.

In step 1301, an end command is executed by the apparatus provided with audio guidance. In step 1302, "0000/00/00 00:00:00" is set as the time 503 of the previous audio reproduction. In this manner, when the apparatus provided with audio guidance is started up on a subsequent occasion, since an initial value is set as the previous time of reproducing audio for each screen, reproduction of audio is ensured at least once. As a result, the effect is obtained that a user can confirm operations using audio guidance at least on one occasion. The resetting process for the screen switching time may be executed during startup in addition to resetting when the printing application ends.

Figure 14:
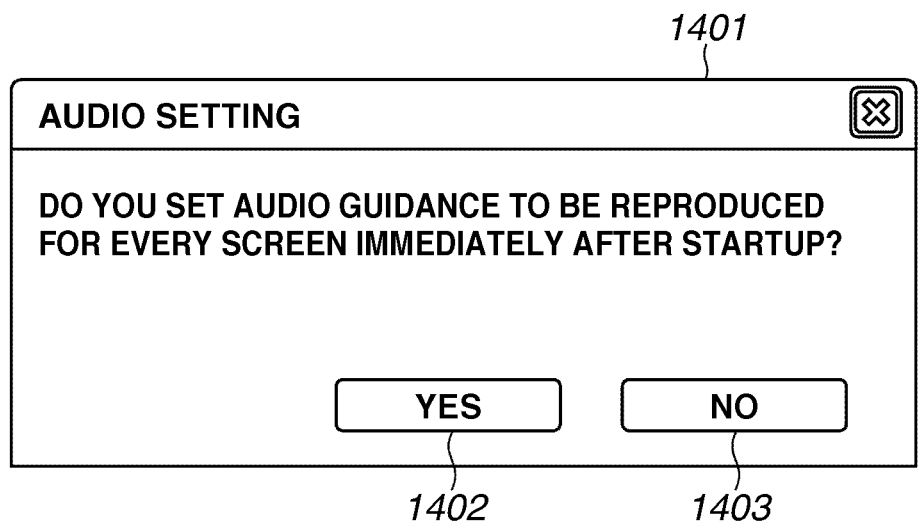
FIG. 14 displays a dialog box prompting whether to reset time at which the screen was switched.

As illustrated in FIG. 14, the resetting process in FIG. 13 when the printing application has ended may be executed when a dialog box is displayed to prompt resetting the screen switching time (the time at which audio was reproduced) and reset is selected.

A dialog box 1401 is configured to prompt whether a user wants to ensure reproduction of audio guidance on each screen immediately after start-up on a subsequent occasion when an end command is executed by an apparatus provided with audio guidance. A button 1402 is configured to stop the apparatus provided with audio guidance after setting "0000/00/00 00:00:00" as the time of reproduction of audio on a previous occasion. Since an initial value is set as the time at which audio was reproduced on a previous occasion for each screen, when the apparatus provided with audio guidance is started up on a subsequent occasion, audio is reproduced with each screen. A button 1403 is configured to stop the apparatus provided with audio guidance without changing the time at which audio was reproduced on a previous occasion. When the apparatus provided with audio guidance is started up on a subsequent occasion, audio is reproduced according to the predetermined time or the time difference of the current time and the time at which audio was reproduced on the previous occasion.

Since a third exemplary embodiment of the present invention is configured in substantially the same manner as the first and second exemplary embodiments, only the points of difference will be described. The third exemplary embodiment will be described with reference to the flowchart in FIG. 3.

Figure 3:
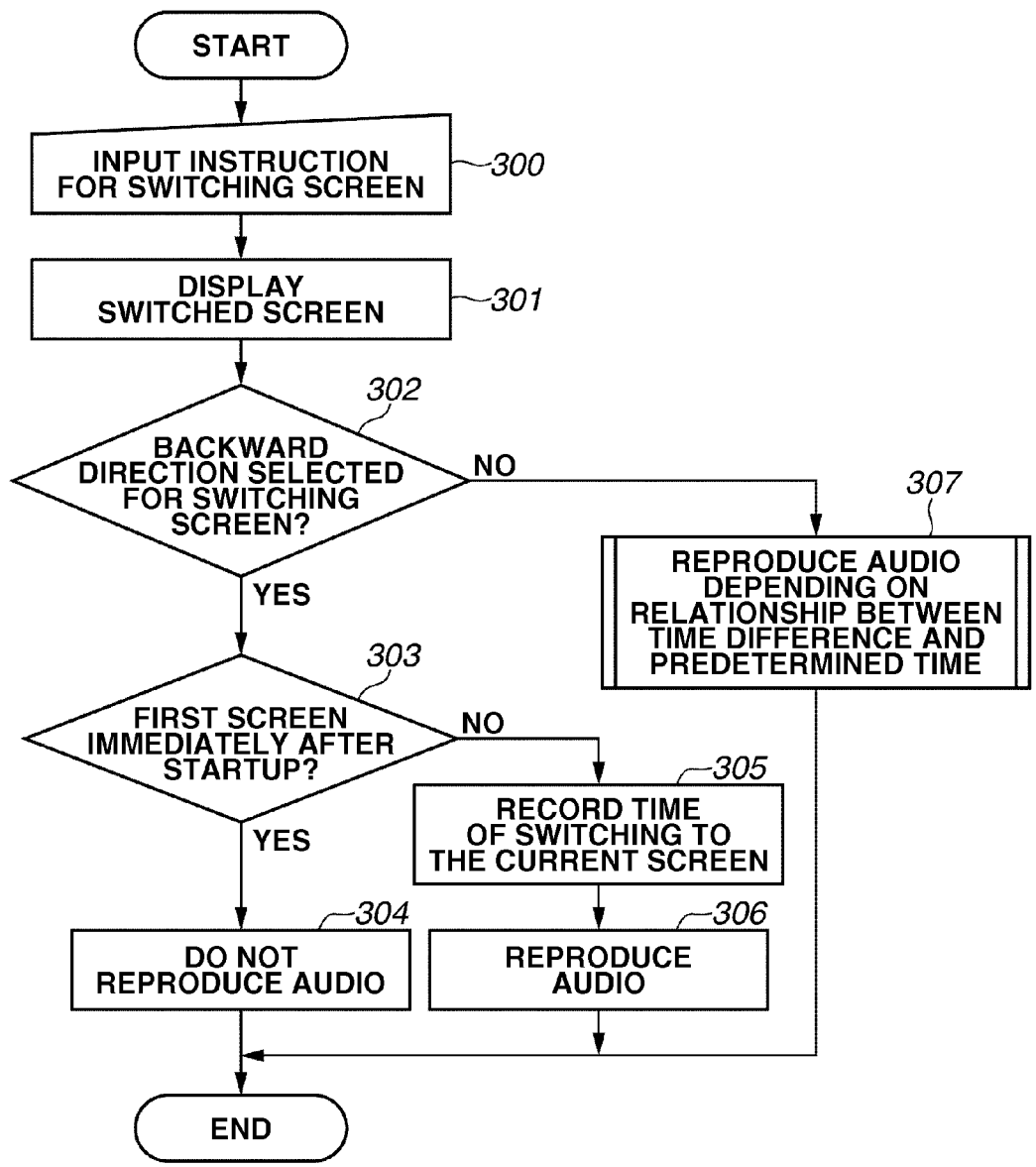
FIG. 3 illustrates a flowchart when switching a screen according to a third exemplary embodiment of the present invention.

FIG. 3 illustrates a control sequence for reproduction of audio guidance corresponding to a screen switching instruction according to the present exemplary embodiment.

When an instruction for screen switching is input in step 300, then in step 301, the screen is switched to display a screen corresponding to the switching instruction. In step 302, it is determined whether the instruction was screen switching in the backward direction. When an instruction is executed in the backward direction (YES in step 302), then in step 303, it is determined whether the screen immediately after startup is the first screen. When the screen immediately after startup is the first screen (YES in step 303), audio is not reproduced in step 304. When the backward direction is instructed and the screen immediately after startup is not first (NO in step 303), then in step 305, the switching time of the screen switching time list is recorded and updated as the current switching time, and then in step 306, audio guidance corresponding to the switched screen is reproduced. When the backward direction is not selected although the screen is switched (NO in step 302), then in step 307, the process in FIG. 2 is executed to reproduce audio depending on the elapsed time from switching the screen on the previous occasion.

A fourth exemplary embodiment of the present invention has almost the same constitution as the first exemplary embodiment, second exemplary embodiment, and third exemplary embodiment, and only the points of difference will be described. The fourth exemplary embodiment will be described with reference to FIG. 4 and FIG. 7.

Figure 7:
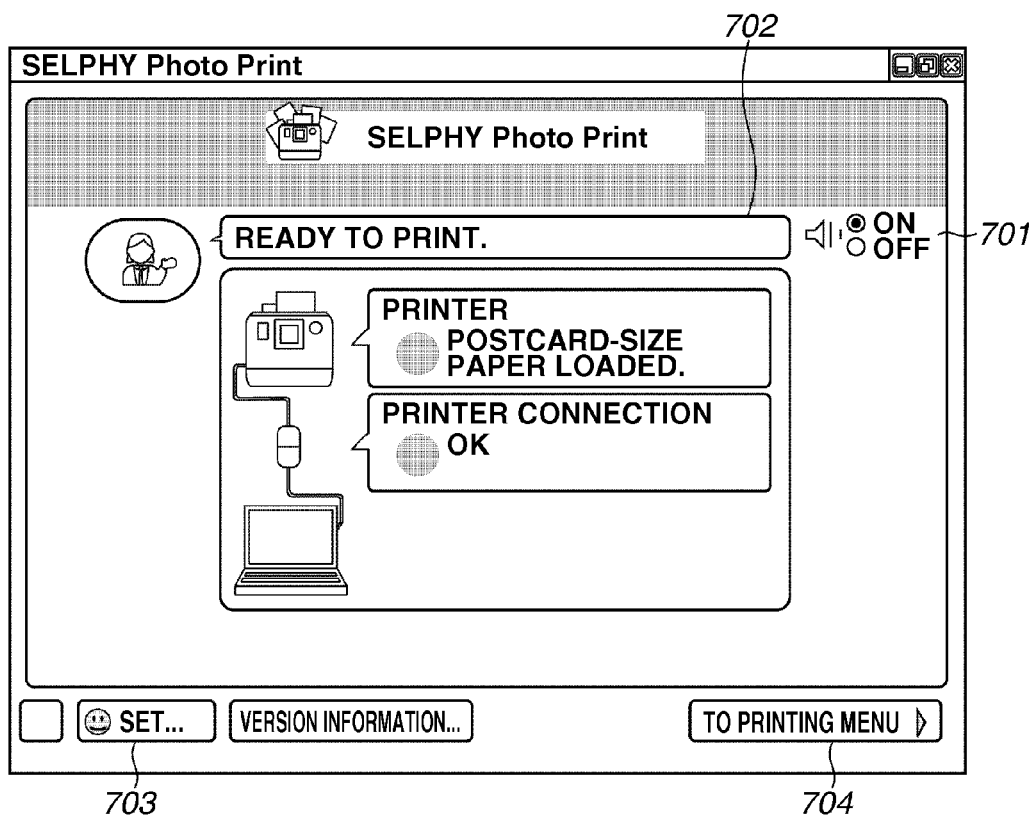
FIG. 7 illustrates a first screen for the printing application according to the fourth exemplary embodiment.

FIG. 7 illustrates an example of the first screen (screen A) of the printing application.

A radio button 701 is configured to enable switching of the audio ON/OFF setting of audio guidance. Normally, when set to audio ON, audio reproduction is enabled, and when set to audio OFF, reproduction of audio is not executed. The setting of audio ON/OFF may enable change of settings on other screens in addition to this screen. When "OFF" is selected, even when the screen is switched, audio guidance is not reproduced. Alternatively, the output device management unit 809 may be adapted not to reproduce audio guidance by setting the output of audio for the speaker 818 to audio OFF. Text 702 has the same contents as the audio guidance set in the first screen. A button 703 is configured to start up the dialog box for the detailed settings of audio guidance. A button 704 is configured to enable transition to the next screen. The switching instruction to the next screen is input and the next screen is displayed by selecting and clicking using the mouse 832 or the keyboard 833. Although the character string of the button is displayed as "to printing menu", the character string may express transition of a screen in the forward direction such as "proceed to next screen", or "proceed to step 2". In this manner, the audio ON/OFF setting for audio guidance is enabled in the printing application of the present exemplary embodiment.

Figure 4:
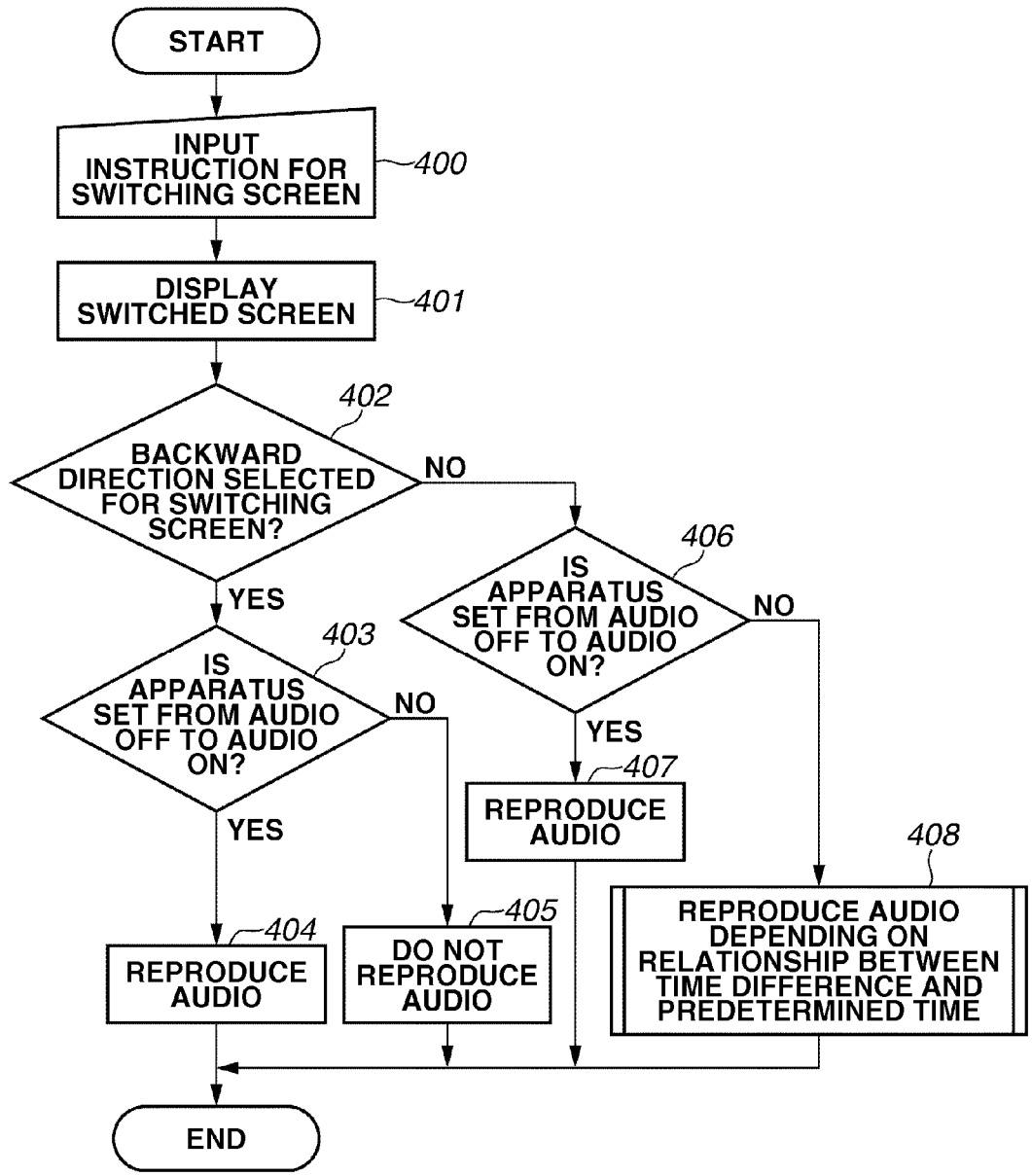
FIG. 4 illustrates a flowchart when switching a screen according to a fourth exemplary embodiment of the present invention.

FIG. 4 illustrates the control sequence for reproduction of audio guidance corresponding to a screen switching instruction according to the present exemplary embodiment.

When an instruction for screen switching is input in step 400, then in step 401, a screen corresponding to the switching instruction in step 400 is displayed. In step 402, it is determined whether the backward direction has been selected when switching the screen. When the backward direction is selected (YES in step 402), then in step 403, it is determined whether the audio of the apparatus has been switched from AUDIO OFF to AUDIO ON. When set to AUDIO ON from AUDIO OFF (YES in step 403), then in step 404, audio guidance is reproduced. When not set to AUDIO ON from AUDIO OFF (NO in step 403), then in step 405, audio guidance is not reproduced. When the backward direction is not selected when the screen is switched (NO in step 402), then in step 406, it is determined whether the audio setting is changed from AUDIO OFF to AUDIO ON. When the setting is changed from AUDIO OFF to AUDIO ON (YES in step 406), then in step 407, audio guidance is reproduced. When the setting is not set from AUDIO OFF to AUDIO ON (NO in step 406), then in step 408, reproduction of audio guidance depending on the elapsed time from reproduction of the previous audio guidance is executed as illustrated in FIG. 2.

In this exemplary embodiment, reproduction of audio guidance is ensured by switching the audio setting to AUDIO ON. That is to say, even when there is a switching instruction to a screen in the backward direction, or even when the predetermined time has not elapsed from reproduction of the same audio guidance on a previous occasion, reproduction of audio guidance can be ensured by switching the audio setting to AUDIO ON. This configuration enables reconfirmation that a user has switched the audio setting of the apparatus to AUDIO ON.

Although the present exemplary embodiment is adapted so that audio guidance is reproduced without reference to the backward direction or the elapsed time on the first occasion immediately after switching the audio setting to AUDIO ON, after the audio setting is switched to AUDIO ON, audio for all screens is reproduced at least once. In this case, a resetting process is executed for the screen switching time as in step 1302 in FIG. 13 according to the change in the audio setting to AUDIO ON.

A fifth exemplary embodiment of the present invention has almost the same constitution as the first exemplary embodiment, second exemplary embodiment, third exemplary embodiment, and fourth exemplary embodiment, and only the points of difference will be described. In the fifth exemplary embodiment, a user can change the value for the predetermined time Tth used in the second exemplary embodiment. The fifth exemplary embodiment will be described with reference to FIGS. 5, 9, 11, and 12.

Figure 9:
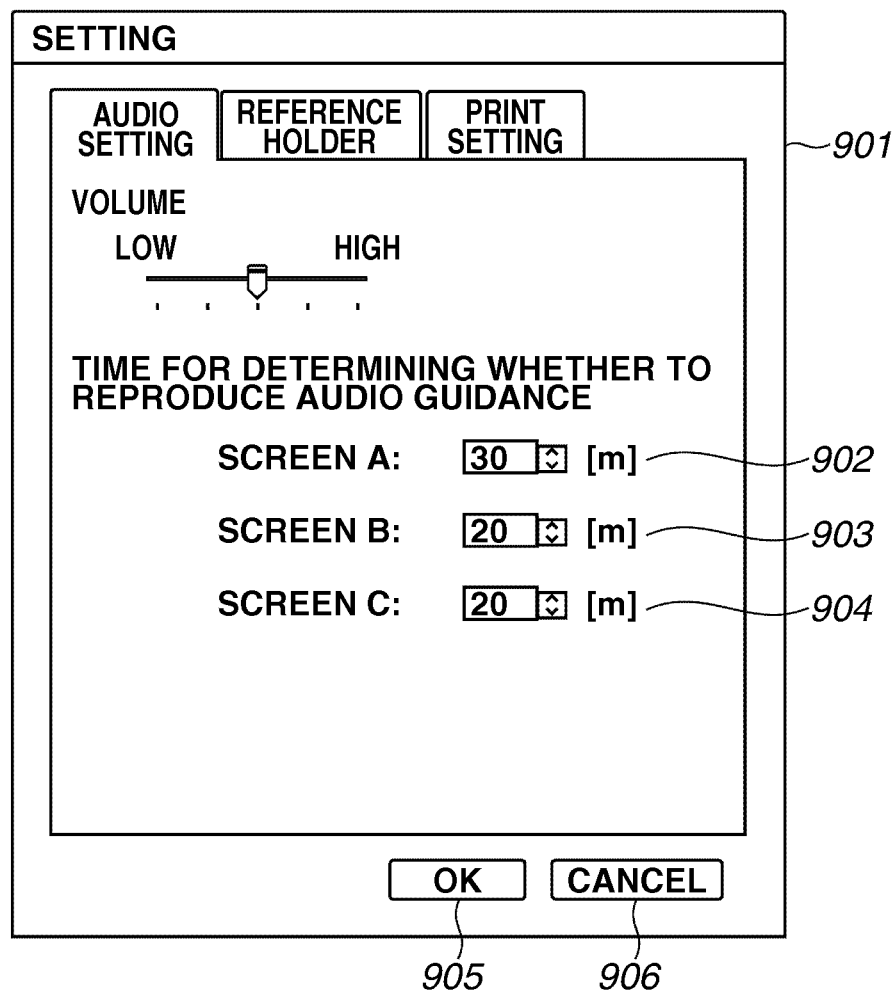
FIG. 9 illustrates an example of an audio setting dialog box according to the fifth exemplary embodiment of the present invention.

FIG. 9 illustrates an example of an audio setting dialog box.

A dialog box 901 is configured to execute detailed settings for audio guidance. Spin boxes 902, 903, and 904 are configured to set the time for determining whether to reproduce audio guidance (the time to reproduction of audio guidance on the next screen switching) on the screens A, B and C. In other words, the same audio guidance cannot be reproduced in the period from reproducing the audio guidance to setting the spin box. A user can execute an arbitrary value according to the various screens. A button 905 is configured to store the value set in the control as described above and close the setting dialog box 901. A button 906 is configured to close the setting dialog box 901 without storing the value set in the control as described above. A setting to a small value or zero may be made in the spin boxes 902, 903, and 904 when audio guidance is not reproduced on each occasion. A limiting value may be set as the value which can be set in these spin boxes. For example, this is due to the fact that when the value set in the spin boxes 902, 903, and 904 is extremely large, audio cannot be reproduced.

FIG. 5 illustrates a screen switching time list according to the present exemplary embodiment.

A data array 501 retains the name of the respective screens and the pointer to previous and following screens. The present exemplary embodiment assumes a printing application having screens including a first screen A to a final screen Z. A data array 502 retains the time of switching to each screen. Although currently the screen B is displayed, the previous display time of the screen B is "2008/10/30 20:55:34". A data array 503 retains the time used for determining whether to reproduce audio for each screen. Since a setting of 20 [m] is executed for screen B, when the forward direction is selected in the current operation and the time at which audio was previously reproduced is 20 [m] or more, audio is reproduced. An arbitrary setting may be executed for the predetermined time on the respective screens.

In the same manner as the second exemplary embodiment, the time of audio reproduction and the time of inputting the screen switching instruction may be recorded in addition to the time of screen switching.

When the screen is switched, data for time 503 corresponding to the switched screen is read from the screen switching time list and that value is used as the predetermined time Tth in the same process as the second exemplary embodiment. Although the predetermined time Tth is a fixed value in the second exemplary embodiment, in this exemplary embodiment, the user can execute an arbitrary setting.

Figure 11:
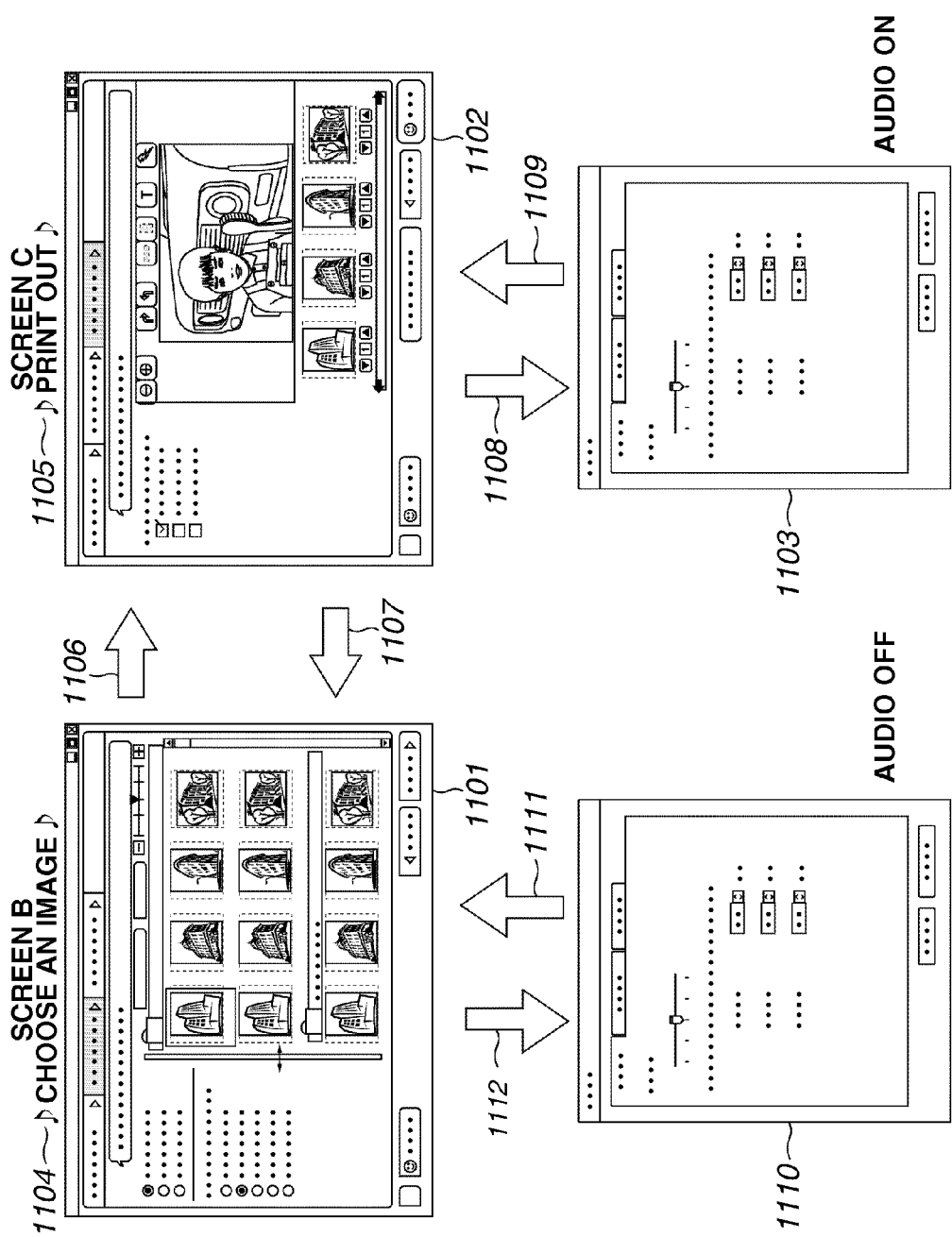
FIG. 11 illustrates a screen transition according to the fifth exemplary embodiment.

FIG. 11 illustrates a screen transition according to the present exemplary embodiment.

The screen B 1101 is configured to select an image for the apparatus and is provided with audio guidance and contains the audio guidance 1104 (♪ choose an image ♪). The screen C 1102 is configured to print an image in the apparatus provided with audio guidance and contains the audio guidance 1105 (♪ print out ♪). The dialog box 1110 set in transition 1112 is started up from screen B. The dialog box for audio settings is set to AUDIO OFF in transition 1111 and the setting dialog box is closed. Next, the forward direction 1106 is selected and the screen is switched to screen C. Since the audio setting of the apparatus provided with audio guidance is set to AUDIO OFF, audio 1105 is not reproduced. The setting dialog box 1103 is started up from screen C in transition 1108. Then, the setting dialog box for audio in transition 1109 is set to AUDIO ON and the setting dialog box is closed. Thereafter, the backward direction 1107 is selected and the routine returns to screen B. Although the screen transition is executed in the backward direction, audio 1104 is reproduced only in this situation in the present exemplary embodiment. Thus, reproduction of audio without reference to an operational state enables a user to reconfirm whether the audio setting of the apparatus provided with audio guidance is correctly set to AUDIO ON. Furthermore, when screen transition proceeds in the backward direction, audio is not reproduced.

Figure 12:
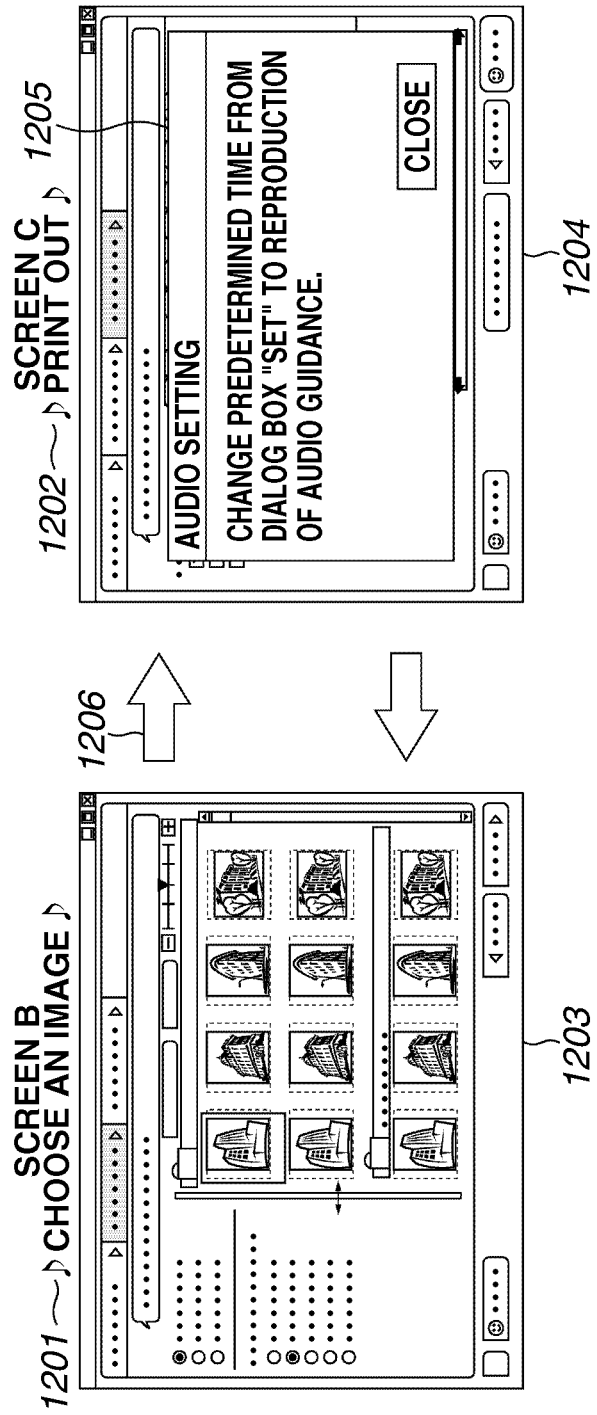
FIG. 12 illustrates a screen transition according to the fifth exemplary embodiment.

FIG. 12 illustrates screen transition according to the present exemplary embodiment.

Screen B 1203 is configured to enable selection of an image in the apparatus provided with audio guidance and retains the audio guidance 1201 (♪ choose an image ♪). The screen C 1204 is configured to print an image in the apparatus provided with audio guidance and contains the audio guidance 1202 (♪ print out ♪). In the present exemplary embodiment, when a transition is made to screen C from screen B in the forward direction 1206, audio is not reproduced when the time difference of the time of the previous audio reproduction on screen C and the current time is less than the predetermined time set on screen C. There is the possibility that a user cannot understand the reason for the lack of audio reproduction on screen C even though the screen transition is in the same forward direction. When audio is not reproduced in a screen transition in the forward direction, to display the audio guidance on the screen, a dialog box 1205 is displayed to change the predetermined time from the dialog box "set" to the reproduction of the audio guidance. In this manner, a user can be guided to a setting dialog box for reproducing audio guidance when the screen transition is in the forward direction.

Figure 10:
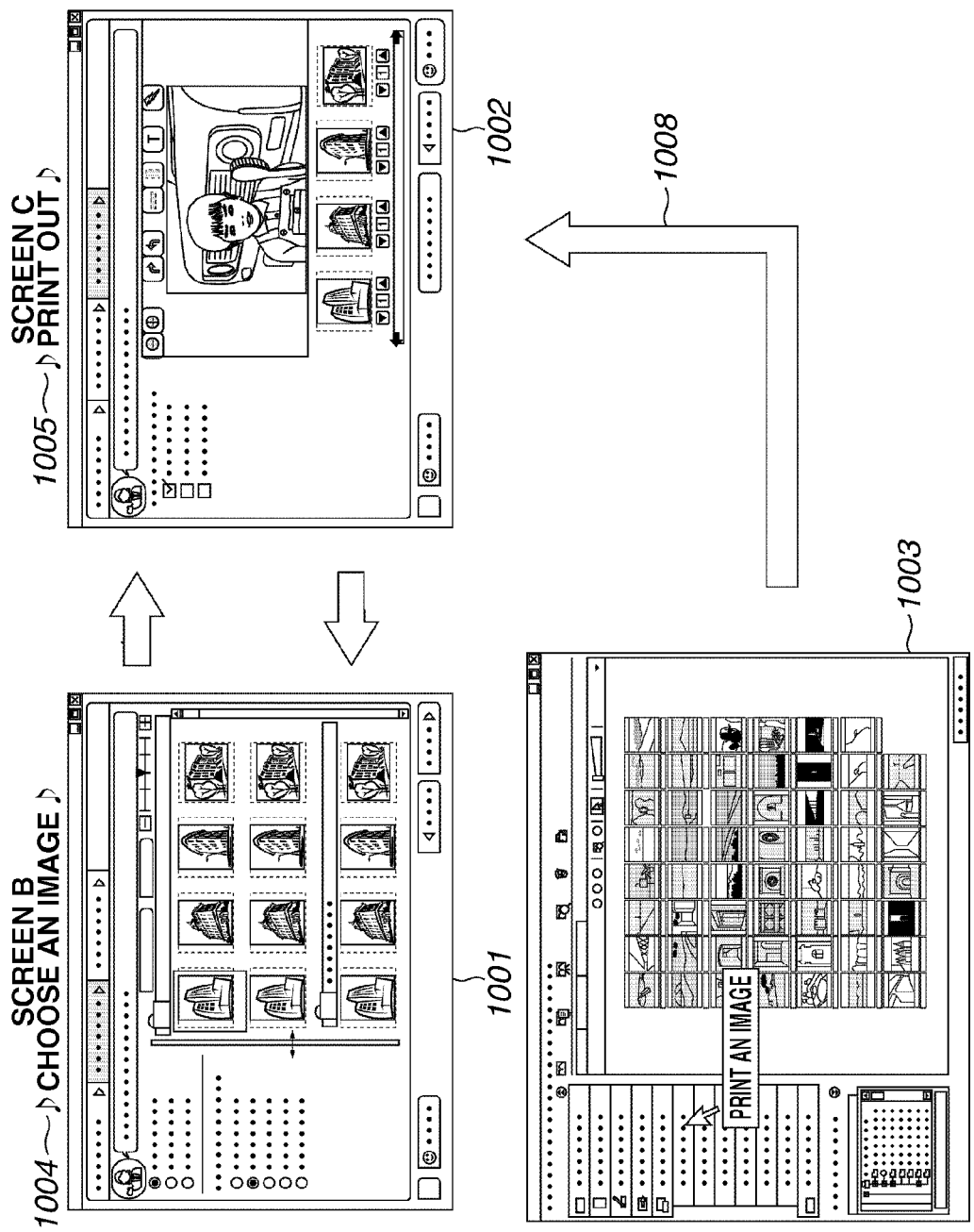
FIG. 10 illustrates a screen transition according to the sixth exemplary embodiment of the present invention.

FIG. 10 illustrates screen transition according to a sixth exemplary embodiment of the present invention.

Screen B 1001 is configured to enable selection of an image and contains the audio guidance 1004 (♪ choose an image ♪). The screen C 1002 is configured to print an image in the apparatus provided with audio guidance and contains the audio guidance 1005 (♪ print out ♪). In the present exemplary embodiment, after selection of an image by an image management apparatus 1003, which is an external apparatus, the information processing apparatus starts up the printing application stored in the program memory 802 and executes control of each unit. A startup command 1008 from the image management apparatus 1003 is configured so that the information processing apparatus starts up the printing application. Since the printing application is operated after selection of an image by a user using the image management apparatus 1003, screen B is skipped and screen C is displayed. In this manner, when the screen immediately after startup is not the first screen, for example, when the user re-selects an image, screen B is to be returned. Once the apparatus provided with audio guidance is finished, after re-selecting the image with the image management apparatus 1003, it is possible to re-activate the apparatus provided with audio guidance. However, the operation sequence is complicated. When the process returns to screen B so that a user can re-select an image, in the exemplary embodiment described above, the backward direction is selected and audio guidance is not reproduced. Therefore, when the screen immediately after startup is not the first screen, audio guidance is reproduced even when the backward direction is selected.

In the above-described exemplary embodiments, control is executed so that audio is not reproduced when returning to the previous screen or when a predetermined time or more has elapsed from displaying the same screen on a previous occasion. However in addition to not reproducing audio, audio guidance which is shorter than normal may be reproduced when returning to the previous screen or when a predetermined time or more has elapsed from displaying the same screen on a previous occasion. Also audio may be reproduced at a higher speed. In this manner, the time for the audio guidance may be shortened, and the troublesome operation associated with numerous repetitions of lengthy audio reproduction can be reduced.

In the above-described exemplary embodiments, the information processing apparatus is realized by control of each unit using a printing application program recorded in the program memory. However, rather than an information processing apparatus, such functions may be realized by a printing apparatus or an image display apparatus.

The present invention includes supply of programs for realizing the functions of the above-described exemplary embodiments to a system or apparatus having a computer which can execute programs directly from a storage medium or using wired or wireless communication and executing such programs.

Thus, the present invention can be realized by program code supplied and loaded to a computer in order to realize the functional processing according to the above-described exemplary embodiments of the present invention with the computer. In other words, the computer program itself for realizing the functional processing according to the exemplary embodiments of the present invention is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-034034 filed Feb. 17, 2009, which is hereby incorporated by reference herein in its entirety.

What is claimed is:

1. An apparatus comprising:
a processor; and
a memory coupled to the processor, the memory having instructions that, when executed by the processor, perform operations comprising:
switching to a screen to be displayed according to an input instruction;
acquiring a first time of the switching to the screen;
acquiring a second time of previous outputting of audio guidance corresponding to the screen;
calculating a time difference between the first time and second time;
determining whether the time difference is more than a predetermined time;
outputting, according to the switching to the screen, audio guidance corresponding to the screen after the switching if the time difference is more than the predetermined time; and
if the time difference is not more than the predetermined time, not outputting the audio guidance corresponding to the screen after the switching,
wherein the time difference is a time elapsing from the previous outputting of audio guidance corresponding to the screen to the switching to the screen.

2. The apparatus according to claim 1, wherein a switching time for each screen is recorded in the memory on a switching time list.

3. The apparatus according to claim 1, further comprising executing an audio ON/OFF settings for reproduction of audio guidance,
wherein audio guidance is reproduced after the audio ON/OFF setting is changed from audio OFF to audio ON.

4. A method comprising:
switching to a screen to be displayed according to switching instructions for the screen;
acquiring a first time of the switching to the screen;
acquiring a second time of previous outputting of audio guidance corresponding to the screen;
calculating a time difference between the first time and second time;
determining whether the time difference is more than a predetermined time;
outputting, according to the switching to the screen, audio guidance corresponding to the screen after the switching if the time difference is more than the predetermined time; and
if the time difference is not more than the predetermined time, not outputting the audio guidance corresponding to the screen after the switching,
wherein the time difference is a time elapsing from the previous outputting of audio guidance corresponding to the screen to the switching to the screen.

5. The method according to claim 4, wherein a switching time for each screen is recorded in the memory on a switching time list.

6. The method according to claim 4, further comprising executing an audio ON/OFF settings for reproduction of audio guidance,
wherein audio guidance is reproduced after the audio ON/OFF setting is changed from audio OFF to audio ON.

* * * * *